United States Patent
Suzuoki (10) Patent No.: US 7,814,166 B2
(45) Date of Patent: Oct. 12, 2010

(54) METHODS AND APPARATUS FOR VIRTUALIZING AN ADDRESS SPACE

(75) Inventor: Masakazu Suzuoki, Minato-ku (JP)

(73) Assignee: Sony Computer Entertainment Inc., Tokyo (JP)

( * ) Notice: Subject to any disclaimer, the term of this patent is extended or adjusted under 35 U.S.C. 154(b) by 1055 days.

(21) Appl. No.: 11/341,724

(22) Filed: Jan. 27, 2006

(65) Prior Publication Data
US 2007/0180041 A1 Aug. 2, 2007

(51) Int. Cl.
*G06F 15/16* (2006.01)
(52) U.S. Cl. .................. 709/207; 711/147; 711/148
(58) Field of Classification Search .......... 709/207; 711/147, 148
See application file for complete search history.

(56) References Cited

U.S. PATENT DOCUMENTS

| | | | |
|---|---|---|---|
| 5,067,075 A * | 11/1991 | Sugano et al. ............. 710/25 |
| 6,526,491 B2 | 2/2003 | Suzuoki et al. | |
| 7,002,956 B2 * | 2/2006 | Banerjee et al. ........... 370/389 |
| 7,177,868 B2 * | 2/2007 | Burton et al. .............. 707/10 |
| 7,185,096 B2 * | 2/2007 | Kalyanavarathan et al. . 709/226 |
| 2002/0083264 A1 | 6/2002 | Coulson | |
| 2003/0061462 A1 | 3/2003 | Fister et al. | |

2006/0195824 A1* 8/2006 Iwamoto ................ 717/133

FOREIGN PATENT DOCUMENTS

| EP | 690384 A2 * | 1/1996 |
| EP | 0690384 A2 | 3/1996 |
| EP | 1103896 A2 | 5/2001 |

OTHER PUBLICATIONS

Dubois Michel, Memory Access Dependencies in shared Memory Multiprocessors, Jun. 1990, IEEE, vol. 16, pp. 1-14.*
Walker, Robert A et al. " Implementing associative processing rethinking earlier architectural decisions" , Parallel and Distributed Processing Symposium Proceedings 15th International Apr. 23-27, 2001 pp. 2092-2100.*
International Search Report and Written Opinion of International Application PCT/JP2007/051335.

* cited by examiner

*Primary Examiner*—Wing F Chan
*Assistant Examiner*—Hitesh Patel
(74) *Attorney, Agent, or Firm*—Matthew B. Dernier, Esq.; Gibson & Dernier LLP (57) ABSTRACT

Methods and apparatus provide for: receiving a memory access request for data from a processor of a multi-processor system; determining whether the data of the memory access request is stored in a remote processing system coupled to the multi-processor system over a communications network; requesting the data from the remote processing system; receiving the data from the remote processing system over the communications network; and providing the data to the processor of the multi-processor system.

17 Claims, 8 Drawing Sheets

SERVER TABLE
160

| SERVER NAME | CONDITION |
|---|---|
| SERVER 0 | A |
| SERVER 1 | B |
| SERVER 2 | C |
| SERVER 3 | D |
| SERVER 4 | E |
| SERVER N | N |

FIG. 5

NETWORK ADDRESS TABLE
162

| NETWORK ADDRESS | MEMORY ADDRESS |
|---|---|
| NET. ADDRESS 0 | MEM. ADDRESS RANGE 0 |
| NET. ADDRESS 1 | MEM. ADDRESS RANGE 1 |
| NET. ADDRESS 2 | MEM. ADDRESS RANGE 2 |
| NET. ADDRESS 3 | MEM. ADDRESS RANGE 3 |
| NET. ADDRESS 4 | MEM. ADDRESS RANGE 4 |
| ... | ... |
| NET. ADDRESS N | MEM. ADDRESS RANGE N |

METHODS AND APPARATUS FOR VIRTUALIZING AN ADDRESS SPACE

BACKGROUND

The present invention relates to methods and apparatus for transferring data within a multi-processing system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In some multi-processing systems, each processor may employ a relatively small local memory in which to execute program code (as opposed to a larger random access memory, RAM). The larger RAM (main or system memory) may be used for bulk storage. The processors may also employ direct memory access (DMA) technology to transfer data from the main memory to the respective local memories.

In a multi-processor system, it may be desirable for the plurality of processors to have access to data in a very wide range of space, such as in other multi-processor systems that are located remotely but accessible over a network. As the latency associated with data transfers between remotely located system may be unpredictable, prior art techniques for managing memory spaces in multi-processor systems are not satisfactory in this regard.

SUMMARY OF THE INVENTION

Aspects of the present invention contemplate providing the processors in a multi-processor environment with access to a wide memory space. Preferably, a dedicated processor is responsible for address translations, data queries, etc. such that the processor requesting the data need only issue a DMA command and obtain the data no matter where in the memory space the data are located.

For example, when a processor requests data in a multi-processor system that is remotely located on a network (such as the Internet), the following actions are preferably carried out: (i) the processor seeking the data issues a DMA command that causes a page fault interrupt to the dedicated processor; (ii) the dedicated processor tests the address of the data to determine whether it is in the memory space (if not the DMA process is terminated); (iii) the dedicated processor sends a request for an IP address (corresponding to the DMA command address) to an administration server; (iv) the administration server accesses a table of IP addresses versus memory space addresses and returns the IP address to the dedicated processor; (v) the dedicated processor sends a DMA command to the IP address (to the remote multi-processor system); (vi) the remote multi-processor system services the DMA request and returns the data to the main memory of the requesting processor; and (vii) the dedicated processor facilitates the servicing of the original DMA request.

In accordance with one or more embodiments of the present invention, methods and apparatus provide for: receiving a memory access request for data from an initiating processor of a multi-processor system; and determining whether the data of the memory access request is stored in a remote processing system coupled to the multi-processor system over a communications network. The methods and apparatus may further provide for: requesting the data from the remote processing system; facilitating the reception of the data from the remote processing system over the communications network; and facilitating providing the data to the initiating processor.

The methods and apparatus may further provide for: obtaining a network address of the remote processing system; and sending an intermediate memory access request for the data to the network address of the remote processing system.

In accordance with one or more embodiments, the methods and apparatus may further provide for sending a request for the network address of the remote processing system to an administration server over the communications network and receiving the network address therefrom. In accordance with one or more embodiments the methods and apparatus may further provide for accessing a network address table, which associates one or more network addresses of one or more remote processing systems with one or more ranges of memory address and selecting one or more of the network addresses that are associated with the data of the memory access request.

In accordance with one or more embodiments, the methods and apparatus may further provide for: requesting the data from the remote processing system by augmenting the memory access request with a network address of the multi-processing system to produce the intermediate memory access request; obtaining one or more physical addresses of the remote processing system associated with virtual addresses associated with the requested data; and/or requesting the data from the remote processing system by augmenting the memory access request with the one or more physical addresses of the remote processing system to produce the intermediate memory access request.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
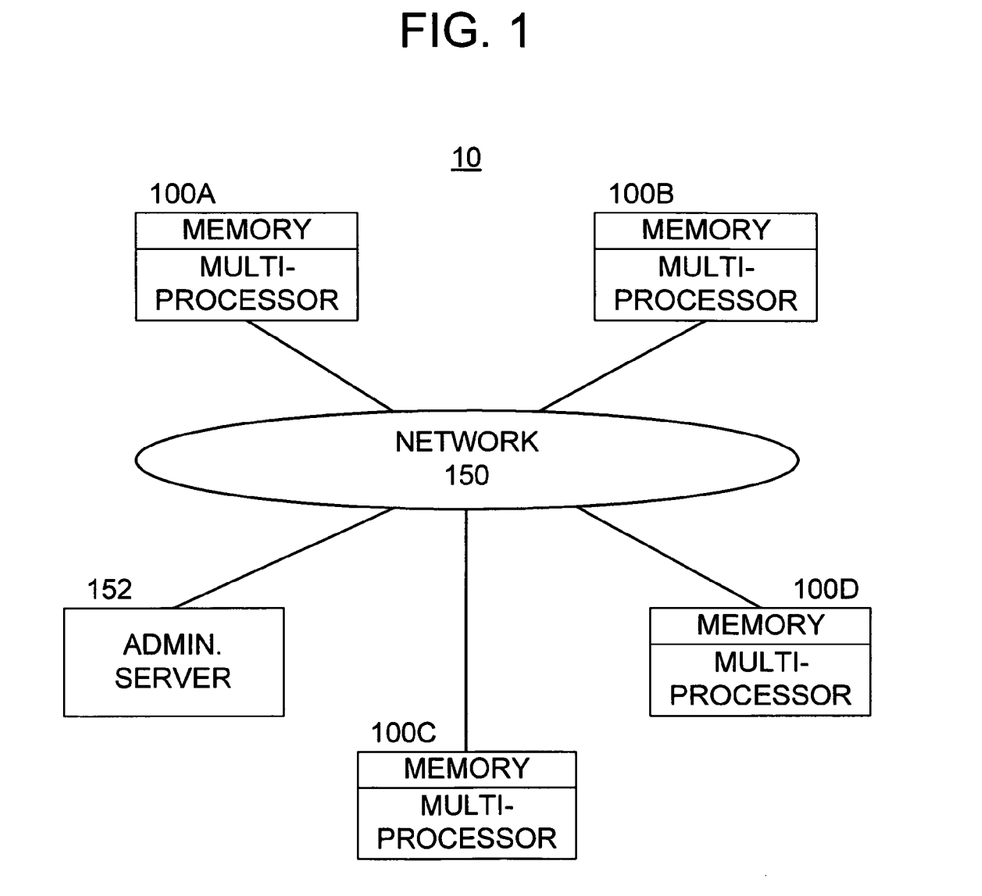
FIG. 1 is a block diagram of a plurality of multi-processor system coupled to one another over a network in accordance with one or more aspects of the present invention.

With reference to the drawings, wherein like numerals indicate like elements, there is shown in FIG. 1 a processing system 10 that may be adapted for carrying out one or more features of the present invention. For the purposes of brevity and clarity, the block diagrams of FIGS. 1-2 will be referred to and described herein as illustrating an apparatus, it being understood, however, that the description may readily be applied to various aspects of a method with equal force.

The processing system 10 includes a plurality of multi-processing systems 100A, 100B . . . 100N, an administration server 152, and a communications network 150 interconnecting such elements. The multi-processor systems 100 will be discussed in more detail herein below with respect to FIG. 2. The communications network 150 may employ any of the known technologies for interconnecting the multi-processors 100, the administration server 152, and any other elements (not shown). For example, the communications network 150 may be a wide area network, such as the Internet.

Figure 2:
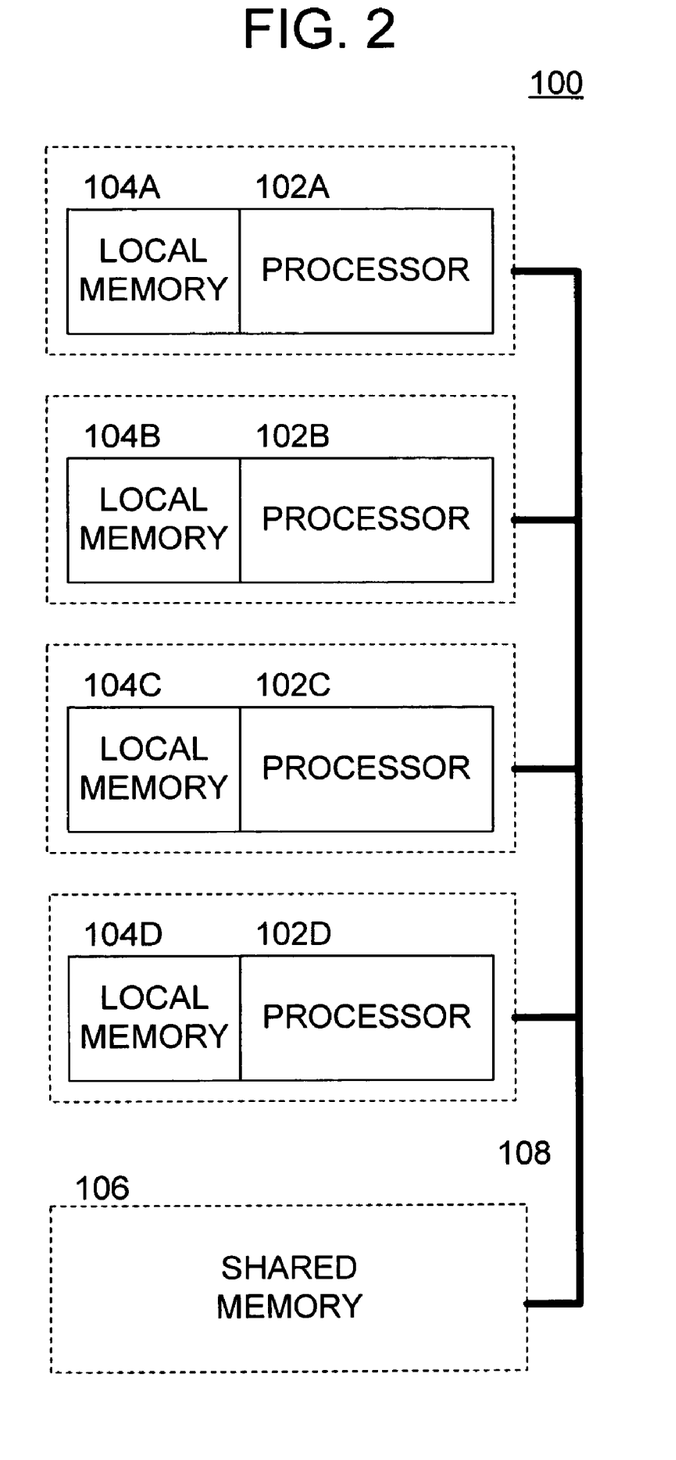
FIG. 2 is a block diagram illustrating the structure of a multi-processing system having two or more sub-processors that may be adapted in accordance with one or more aspects of the present invention.

FIG. 2 is a block diagram of a multi-processing system 100 that may be adapted to implement the features discussed herein and one or more further embodiments of the present invention. The system 100 includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The processors 102 may be implemented utilizing any of the known technologies that are capable of requesting data from the system memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function. As on-chip space may be limited, the size of the local memories 104 may be much smaller than the system memory 106.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown, which may be disposed internally or externally with respect to the processors 102.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

In accordance with one or more aspects of the present invention, the multi-processor systems 100 are preferably operable to execute programs and manipulate data utilizing associated memories thereof as well as the memories of other multi-processor systems 100 coupled over the network 150. Thus, for example, the multi-processor 100A is preferably operable to request data from the memory associated with multi-processor 100D by requesting such data and receiving same over the network 150. In this sense, the memory space of multi-processor 100A includes its associated memory (the local memory 104A, other local memories 104, the shared memory 106, etc.) and one or more of the memories associated with the other multi-processors 100B, 100C, 100D, etc. This feature will be discussed in more detail herein below.

Figure 3:
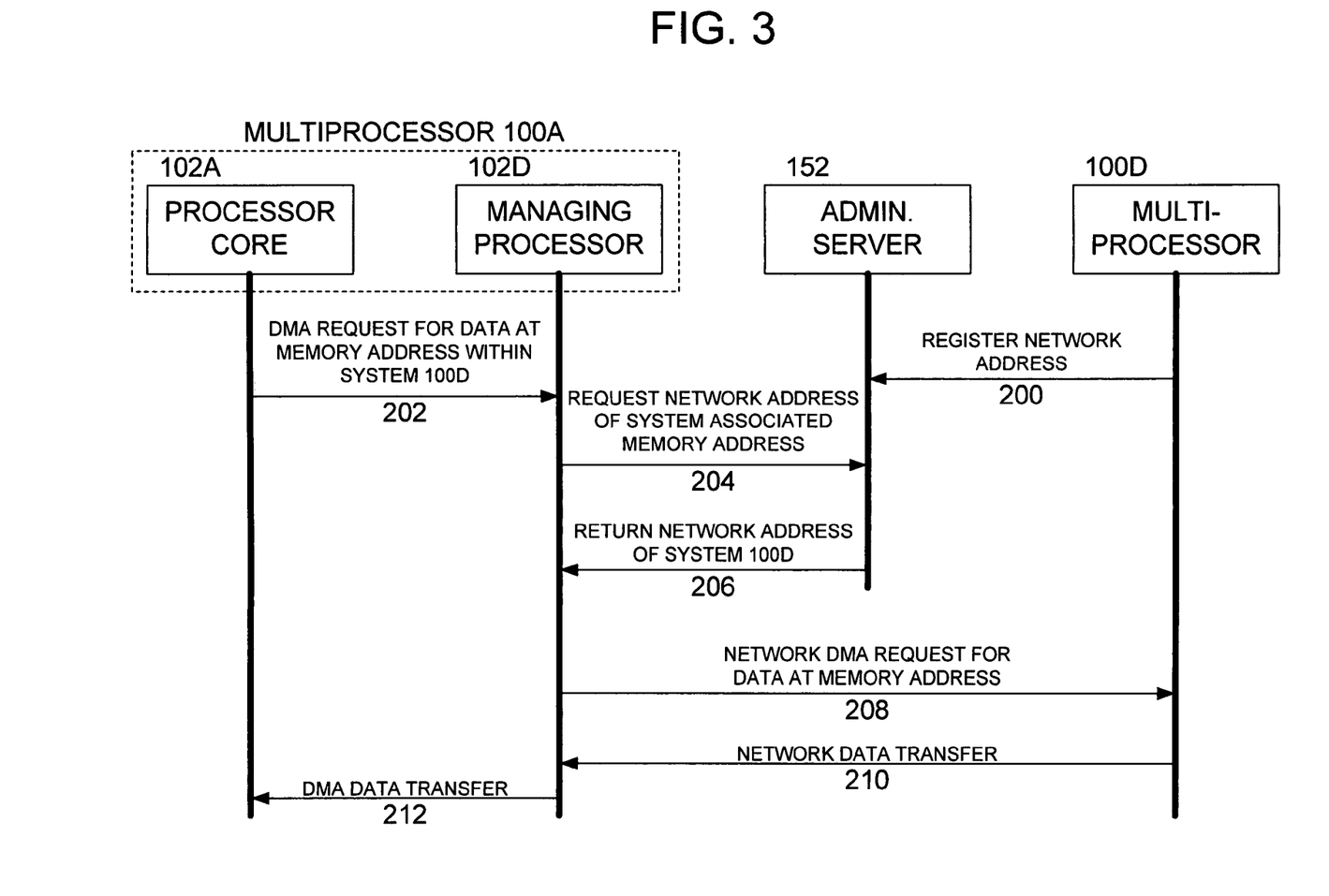
FIG. 3 is a partial block diagram and partial flow diagram illustrating process steps that may be carried out by one or more of the elements of FIGS. 1-2 and/or other embodiments herein.

With referenced to FIGS. 1-3, one of the processors 120 of the system 100A, such as processor 120A, may request data that is stored within another of the multi-processor systems 100, such as multi-processor 100D. More particularly, the processor core 102A may access data that is stored in the shared memory 106 of the multi-processor system 100D. In this sense, the memory space associated with the processor core 102A includes the local memory 104A associated with the processor 102A, the shared memory 106 of the multi-processor system 100A, and some or all of the shared memory 106 of the multi-processor system 100D.

In accordance with one or more embodiments of the present invention, and in keeping with the example above, the processor core 102A is preferably operable to generate a memory access request for data at a particular virtual address of its memory space. It is noted herein that the memory access request may cover a range of virtual memory addresses, although for simplicity such addresses will be referred to in the singular. In a preferred embodiment, the memory access request is a DMA request specifying a block of data to be stored in the local memory 104A of the processor 102A (action 202). Another of the processors 102, such as processor 102D, preferably takes on the role of a managing processor. In response to the memory access request by the processor core 102A, the managing processor 102D preferably determines whether the data of the memory access request is stored in a participating remote processing system, such as the multi-processor 100D.

In a preferred embodiment, the DMA request (memory access request) is initially issued to a DMA handler. If the memory access request is for data stored within the shared memory 106 of the multi-processor 100A, then the DMA handler preferably facilitates such transfer of data without intervention by the managing processor 102D. If the virtual address associated with the memory access request is outside a predetermined range (necessitating transfer of the associated data over the network 150), then the DMA handler preferably issues a page fault interrupt request. The page fault interrupt request preferably initiates the managing processor 102D to take action with respect to the memory access request.

Initially, the managing processor 102D preferably determines whether the virtual address is legal (e.g., within a permitted range despite being mapped to a remote memory location) or whether the virtual memory is illegal (e.g., outside a permitted range). By way of example, a permitted range of addresses may include addresses associated with any participating multi-processor systems 100, such as multi-processor 100B, 100C, 100D, etc. If the virtual address is outside the permitted range, then the managing processor 102D preferably terminates the memory access request. If, however, the virtual address is within a permitted range, then the managing processor 102D preferably facilitates a request for the data and a transfer of the data from the multi-processor system 100D.

When the managing processor 102D determines that the requested data are stored in a remote multi-processor system 100, it preferably sends a request for a network address of the remote processing system to the administration server 152 over the communications network 150 (action 204). The request for the network address may include the virtual address specified within the memory access request issued by the processor core 102A. The administration server 152 preferably receives the network address request from the managing processor 102D and returns the network address of the multi-processor system 100 at which the requested data are stored, such as the network address of the multi-processor 100D (action 206).

Figure 4:
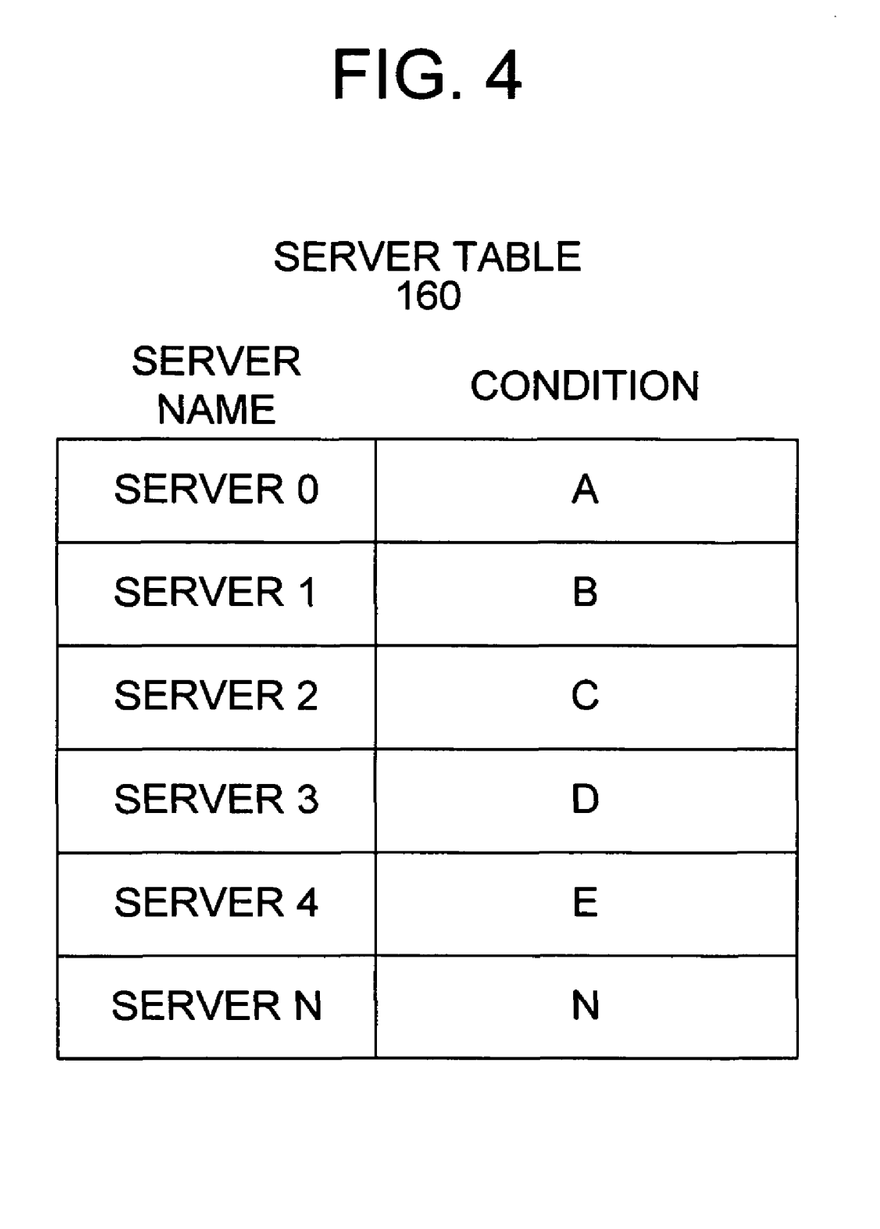
FIG. 4 is a block diagram illustrating the structure of a server table that may be employed by one or more of the processors of the system of FIG. 2 (and/or other embodiments herein)

With reference to FIG. 4, alternative embodiments of the present invention may include a plurality of administration servers 152 coupled over the network 150. In such embodiments, the managing processor 102D preferably has access to a server table 160, which associates the plurality of administration severs with one or more respective conditions. These conditions may include the geographic and/or network location of the multi-processor system 100A and/or the administration server itself. The conditions may also include parameters defined by an application program running on the multi-processor system 100A, the range and extent of the virtual address, etc.

Figure 5:
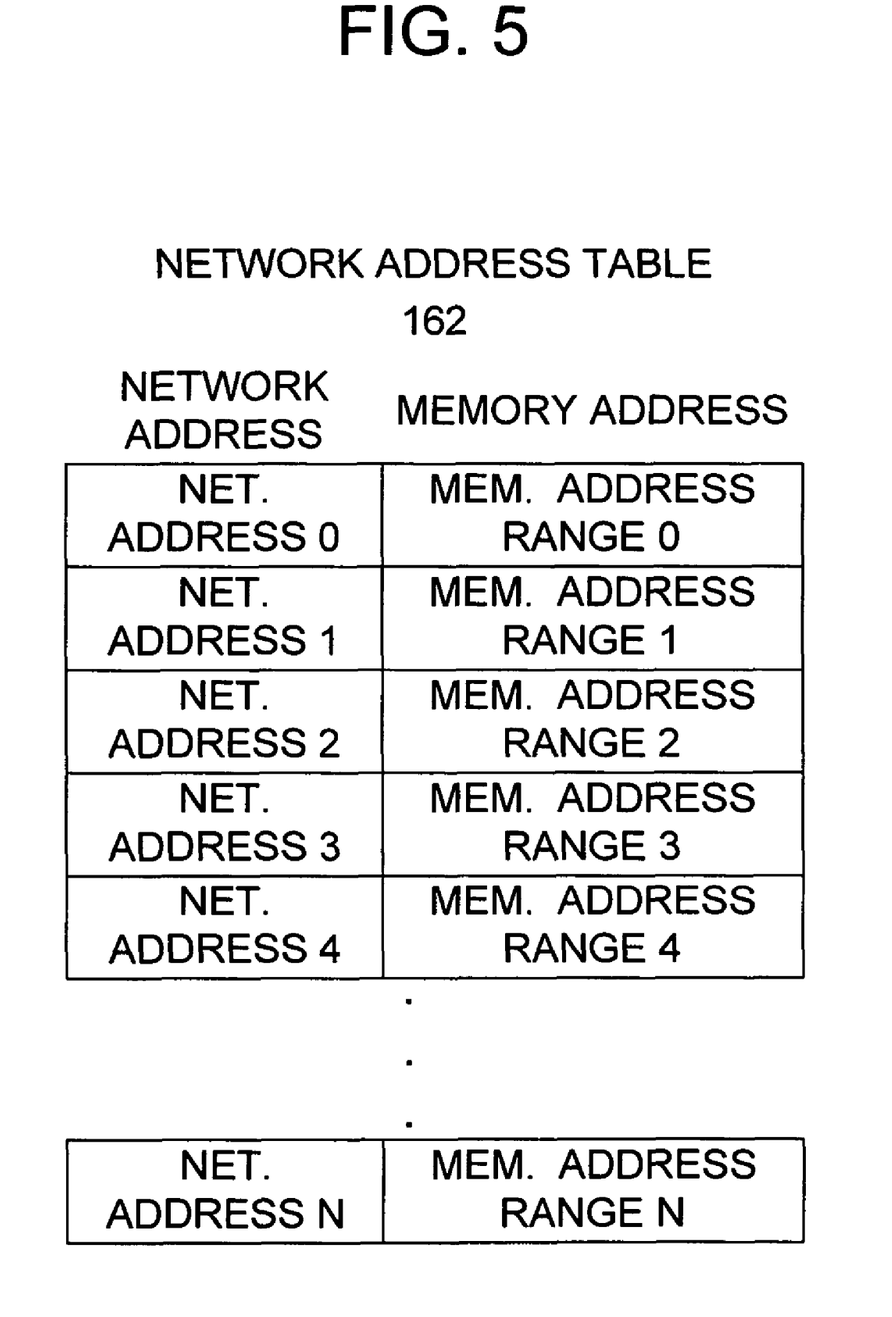
FIG. 5 is a block diagram illustrating the structure of a network address table that may be employed by the server of the system of FIG. 1 (and/or other embodiments herein)

With reference to FIG. 5, and in accordance with a preferred embodiment of the present invention, the administration server 152 preferably maintains a network address table 162, which associates a number of network addresses with respective memory address ranges. For example, network address 0 may be associated with memory address range 0, network address 1 may be associated with memory address range 1, network address 2 may be associated with memory address range 2, etc. The memory address ranges are preferably determined in accordance with a registration process (action 200) carried out as between the administration server 152 and the participating multi-processor systems 100. For example, the multiprocessor system 100D may have engaged in a registration process in which the multi-processor 100D identified memory address range 2 as being associated with its network address 2. In response, the administration server 152 preferably maintains an entry within the network address table 162 that associates network address 2 with memory address range 2, thereby registering the multi-processor 100D.

In response to the network address request (action 204) issued by the managing processor 102D to the administration server 152, the administration server 152 preferably accesses the network address table 162 and compares the virtual address with the memory address ranges. When the virtual address may be mapped to a particular memory address range, such as memory address range 2, then the administration server 152 preferably selects the associated network address, such as network address 2. Thereafter, the administration server 152 preferably returns the network address 2 to the managing processor 102D over the network 150. It is noted that the response from the administration server 152 to the managing processor 102D may include the network address as well as the physical address (or address range) associated with the virtual address of the requested data. In other words, the administration server 152 may provide a memory translation function in which the virtual address of the original memory access request by the processor core 102A is translated into the physical address of the shared memory 106 of the multi-processor system 100D.

Next, the managing processor 102D preferably sends an intermediate memory request for the data to the multi-processor 100D utilizing the network address provided by the administration server 152 (action 208). In a preferred embodiment, the intermediate memory access request includes at least one of the network address of the multi-processor system 100A, and the physical address (or range of addresses) of the multi-processor system 100D at which the requested data are stored. In a preferred embodiment, the intermediate memory access request is a DMA request seeking a block data transfer from the shared memory 106 of the multi-processor system 100D to the multi-processor system 100A.

The managing processor preferably reserves space within the shared memory 106 of the multi-processor 100A into which to receive the data transferred from the multi-processor 100D over the network 150.

At action 210, the multi-processor system 100D preferably services the intermediate memory access request by conducting a data transfer over the communications network 150 to facilitate the transfer of the requested data into the shared memory 106 of the multi-processor system 100A.

In accordance with one or more alternative embodiments of the present invention, the managing processor 102D may gain access to the network address table 162 and/or to a partial or full facsimile thereof within the multi-processor 100A. In this circumstance, the managing processor 102D need not handshake with the administration server 152 (actions 204, 206) in order to obtain the network address of the multi-processor 100D. Access to the network address table 162 may be obtained in any number of ways, including a download of data from the administration server 152 to the multi-processor 100A, a learned process in which the managing processor 102D stores a history of network address requests and responses sufficient to build the network address table 162, etc.

Once the data have been transferred from the multi-processor system 100D to the multi-processor system 100A, the managing processor 102D preferably facilitates the transfer of such data from the shared memory 106 to the local memory 104A of the processor 102A (action 212). Notably, from the point of view of the processor 102A, the memory access request for the data stored remotely was neither initiated nor serviced in a different way than data stored within the stored memory 106 of the multi-processor 100A itself. Thus, the processor 102A may efficiently execute program code and manipulate data without undue burdens associated with formulating and carrying out the handshaking and interfacing necessary to facilitate the transfer of data from the multi-processor 100D to the multi-processor 100A over the network 150. Instead, the processing effort associated with that activity is born by the managing processor 102D. In a preferred embodiment, the managing processor 102D bears that burden with respect to all the participating processors within the multi-processor 100A. Similarly, the managing processor 102D preferably facilitates any requests for data made to the multi-processor 100A by other multi-processors 100 seeking to obtain data therefrom.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 6:
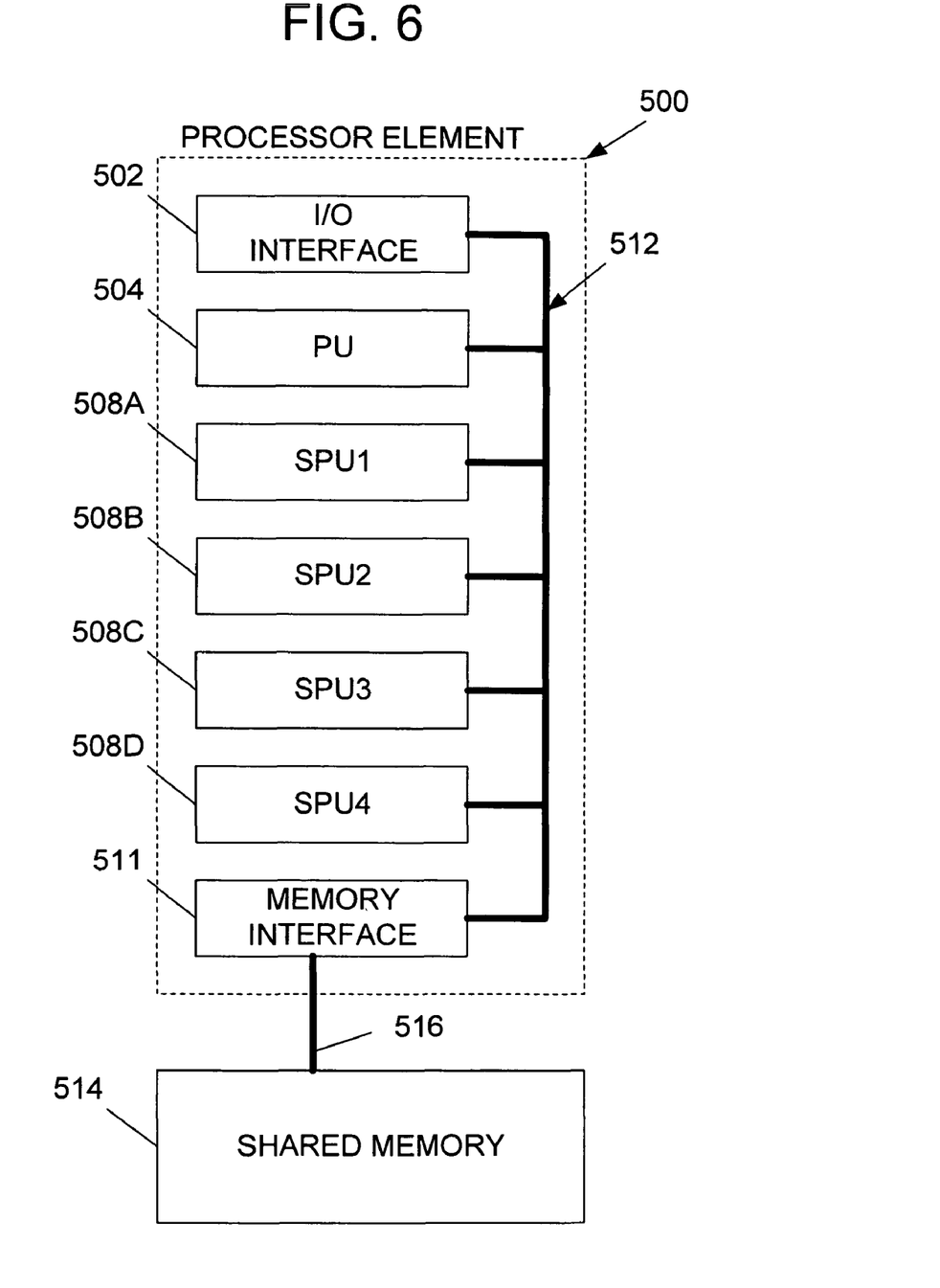
FIG. 6 is a block diagram illustrating a preferred processor element (PE) that may be used to implement one or more further aspects of the present invention.

With reference to FIG. 6, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsenide, gallium aluminum arsenide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 7:
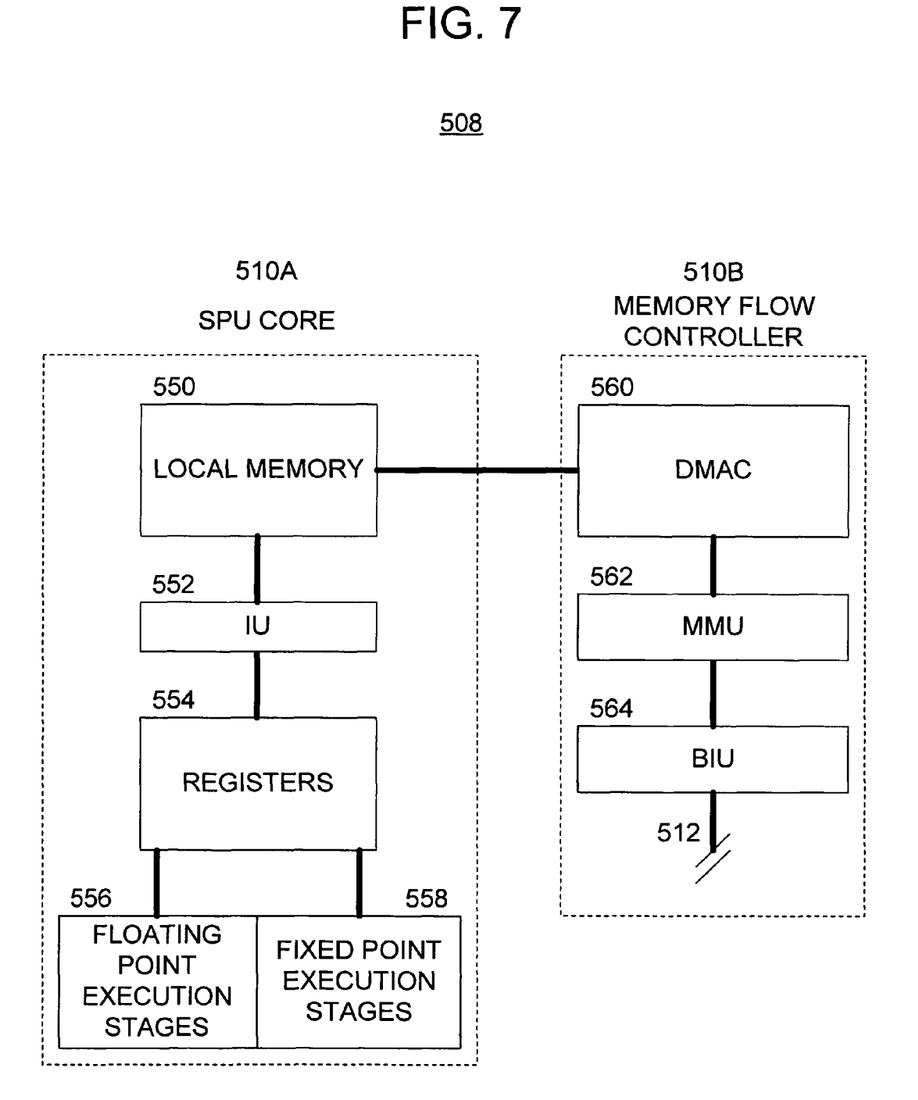
FIG. 7 is a diagram illustrating the structure of an exemplary sub-processing unit (SPU) of the system of FIG. 6 that may be adapted in accordance with one or more further aspects of the present invention.

FIG. 7 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data-computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M- byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 8:
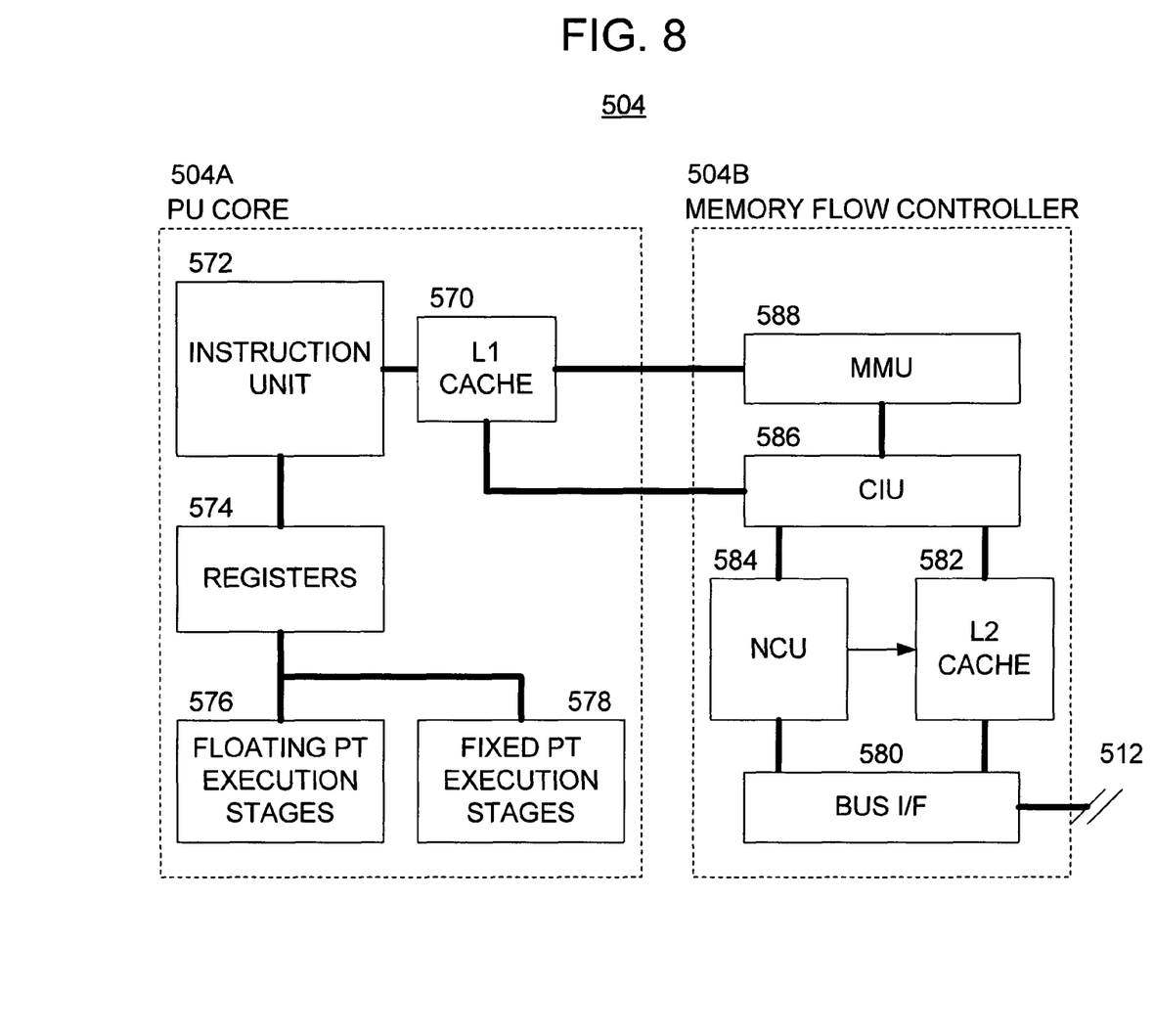
FIG. 8 is a diagram illustrating the structure of an exemplary processing unit (PU) of the system of FIG. 6 that may be adapted in accordance with one or more further aspects of the present invention.

FIG. 8 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a super pipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    dedicating one of a plurality of processors in a multi-processing system to perform data access management for the others of the plurality of processors;
    issuing a direct memory access (DMA) command requesting data from a requesting processor among the plurality of processors of the multi-processing system;
    issuing a page fault interrupt in response to the DMA command by a DMA controller of the multi-processing system;
    receiving the page fault interrupt at the dedicated processor and recognizing same to be associated with the request for data from the requesting processor of the multi-processor system;
    determining whether the data of the memory access request is stored in a remote processing system coupled to the multi-processor system over a communications network by testing, within the dedicated processor, an address of the DMA command to determine whether the data is in a local memory space of the multi-processing system by evaluating whether one or more memory addresses associated with the memory access request is outside a predetermined range, where the predetermined range is defined by one or more memory units coupled to the processor of the multi-processing system;
    sending a request for a network address of the remote processing system from the dedicated processor to an administration server over the communications network;
    receiving the network address of the remote processing system at the dedicated processor from the administration server over the communications network;
    sending a DMA command requesting the data from the dedicated processor to the remote processing system;
    receiving the data at the dedicated processor from the remote processing system over the communications network; and
    providing the data to the requesting processor of the multi-processor system.

2. The method of claim 1, further comprising accessing a server table including a list of one or more administrative servers and selecting a network address associated with the administrative server to which to send the request for a network address of the remote processing system.

3. The method of claim 1, wherein the step of requesting includes: sending an intermediate memory access request for the data to the network address of the remote processing system.

4. The method of claim 3, wherein:
    the step of requesting the data from the remote processing system includes augmenting the memory access request with a network address of the multi-processing system to produce the intermediate memory access request; and the step of receiving the data from the remote processing system over the communications network includes receiving the data at the network address of the multi-processing system.

5. The method of claim 4, wherein:

the step of receiving the network address of the remote processing system from the administration server includes receiving one or more physical addresses of the remote processing system associated with virtual addresses associated with the requested data; and the step of requesting the data from the remote processing system includes augmenting the memory access request with the one or more physical addresses of the remote processing system to produce the intermediate memory access request.

6. The method of claim 1, further comprising:

accessing a network address table, which associates one or more network addresses of one or more remote processing systems with one or more ranges of memory address; and selecting one or more of the network addresses that are associated with the data of the memory access request.

7. The method of claim 6, wherein at least one of:

the step of requesting includes sending an intermediate memory access request for the data to the network address of the remote processing system;

the step of requesting the data from the remote processing system includes augmenting the memory access request with a network address of the multi-processing system to produce the intermediate memory access request; and the step of receiving the data from the remote processing system over the communications network includes receiving the data at the network address of the multi-processing system.

8. The method of claim 1, wherein at least one of:

the dedicated processor of the multi-processing system performs at least the steps of determining, sending, and providing;

the requesting processor issues the memory access request for data;

the memory access request is a direct memory access (DMA) request for data; and the step of providing the data to the processor includes facilitating a DMA data transfer of the data to the requesting processor.

9. An apparatus, comprising:

a plurality of processors capable of operative communication with a main memory; and a respective local memory coupled to each of the processors, wherein;

one of the processors is dedicated to: (i) receive a direct memory access (DMA) command requesting data from an initiating processor of a multi-processor system, (ii) determine whether the data of the memory access request is stored in a remote processing system coupled to the multi-processor system over a communications network by testing, within the dedicated processor, an address of the DMA command to determine whether the data is in a local memory space of the multi-processing system, (iii) send a request for a network address of the remote processing system to an administration server over the communications network; and (iv) receive the network address of the remote processing system from the administration server over the communications network; and the dedicated processor further operates to: (i) request the data from the remote processing system by sending a DMA command requesting the data, (ii) facilitate receiving the data from the remote processing system over the communications network, and (iii) facilitate providing the data to the initiating processor.

10. The apparatus of claim 9, wherein the dedicated processor further operates to:

send an intermediate memory access request via a DMA command for the data to the network address of the remote processing system.

11. The apparatus of claim 10, wherein the dedicated processor further operates to:

access a network address table, which associates one or more network addresses of one or more remote processing systems with one or more ranges of memory address, and select one or more of the network addresses that are associated with the data of the memory access request.

12. The apparatus of claim 10, wherein the dedicated processor further operates to at least one of:

request the data from the remote processing system by augmenting the memory access request with a network address of the multi-processing system to produce the intermediate memory access request;

obtain one or more physical addresses of the remote processing system associated with virtual addresses associated with the requested data; and request the data from the remote processing system by augmenting the memory access request with the one or more physical addresses of the remote processing system to produce the intermediate memory access request.

13. The apparatus of claim 9, wherein at least one of:

the local memories are not hardware cache memories; and each processor is capable of executing programs within its local memory, but each processor is not capable of executing programs within the main memory.

14. The apparatus of claim 9, wherein at least one of:

the processors and associated local memories are disposed on a common semiconductor substrate; and processors, associated local memories, and the main memory are disposed on a common semiconductor substrate.

15. A non-transitory, computer-readable storage medium containing an executable program, the executable program operating to cause a multi-processing system to execute actions including:

dedicating one of a plurality of processors in a multi-processing system to perform data access management for the others of the plurality of processors;

receiving a memory access request for data via a direct memory access (DMA) command from an initiating processor of the multi-processor system;

determining whether the data of the memory access request is stored in a remote processing system coupled to the multi-processor system over a communications network by testing, within the dedicated processor, an address of the DMA command to determine whether the data is in a local memory space of the multi-processing system;

obtaining a network address of the remote processing system at the dedicated processor; and sending an intermediate memory access request for the data via DMA command from the dedicated processor to the network address of the remote processing system;

facilitating, by action of the dedicated processor, reception of the data from the remote processing system over the communications network; and providing, by action of the dedicated processor, the data to the initiating processor.

16. The non-transitory, computer-readable storage medium of claim 15, wherein the actions further include at least one of:

sending a request for the network address of the remote processing system from the dedicated processor to an administration server over the communications network and receiving the network address therefrom; and accessing a network address table, within the administration server, which associates one or more network addresses of one or more remote processing systems with one or more ranges of memory address and selecting one or more of the network addresses that are associated with the data of the memory access request.

17. The non-transitory, computer-readable storage medium of claim 15, wherein the actions of the dedicated processor further include at least one of:

requesting the data from the remote processing system by augmenting the memory access request with a network address of the multi-processing system to produce the intermediate memory access request;

obtaining one or more physical addresses of the remote processing system associated with virtual addresses associated with the requested data; and requesting the data from the remote processing system by augmenting the memory access request with the one or more physical addresses of the remote processing system to produce the intermediate memory access request.

* * * * *